United States Patent
Bauer et al.

(10) Patent No.: US 12,182,020 B1
(45) Date of Patent: Dec. 31, 2024

(54) SYSTEM AND METHOD FOR CREATING A HIGH-LEVEL PARAMETER RELATIONAL DATA MODEL FOR MEMORY CONFIGURABILITY SOLUTIONS

(71) Applicant: Cadence Design Systems, Inc., San Jose, CA (US)

(72) Inventors: Joseph Bernard Bauer, Evergreen, CO (US); Shyam Sharma, Milpitas, CA (US); Vamsi M. Banapuram, Pleasonton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 34 days.

(21) Appl. No.: 18/339,290

(22) Filed: Jun. 22, 2023

(51) Int. Cl.
*G06F 12/0811* (2016.01)

(52) U.S. Cl.
CPC ................ *G06F 12/0811* (2013.01)

(58) Field of Classification Search
CPC .................................................. G06F 12/0811
See application file for complete search history.

(56) References Cited

U.S. PATENT DOCUMENTS

| | | | | |
|---|---|---|---|---|
| 6,070,165 | A * | 5/2000 | Whitmore | G06F 16/284 |
| 2012/0166451 | A1 * | 6/2012 | Arnold | G06F 16/58 |
| | | | | 707/748 |
| 2021/0350282 | A1 * | 11/2021 | Schulz | G06N 20/00 |

OTHER PUBLICATIONS

Vahid Nourbakhsh, John Turner, Dynamized routing policies for minimizing expected waiting time in a multi-class multi-server system, Computers & Operations Research, vol. 137 (Year: 2022).*

* cited by examiner

*Primary Examiner* — Jason W Blust
(74) *Attorney, Agent, or Firm* — Mark H. Whittenberger; Holland & Knight LLP

(57) ABSTRACT

Embodiments are directed towards a method for creating a relational memory designed for one or more key parameters in at least one memory part configurations library. The method may include identifying one or more high-level parameters (HLPs) within the at least one memory part configurations library, assigning each non-HLP parameter an HLP key, using the assigned HLP keys as a frame of reference to cross-correlate each non-HLP parameter with every other non-HLP parameter in the at least one memory part configurations library. The method may also include extracting a complete relational memory attribute set from the cross-correlated parameters in the at least one memory part configurations library, generating memory configuration metadata equivalent to the at least one memory part configurations library from the complete relational memory attribute set, and providing memory part automation from the generated memory configuration metadata.

20 Claims, 9 Drawing Sheets

HRDM Details – Output Transforms
Memory Part configuration tasks optimized across the full eco-system flow, eg:

| Config Task/Benefit Description | Example Transform Output Format |
|---|---|
| Relational Data discovery<br>• Automation of config HLP data relations from parts library<br>• Config discovery optimization – The config discovery algorithms use search for config value features to only the HLPs | Parts Library -to- RDM Schema<br>[SQL|YAML|Linked/mapped Tables|Datastruct...] |
| Config space query + analysis + selection<br>• Runtime query/select [param & | HLP] sets *at O(1) speed*<br>• User 'join' – expand RDM to applicable TB sensitive value tables, eg: controller's FIFO depth, command Q select, applied speed/latency, BIOS params... | RDM Schema -to- APIs/Queries<br>SELECT * FROM * JOIN * ON<br>Or equivalent<br>[SQL, mysql, SQLA, Java.sql JDBC...] |
| Config space resolve – custom-scope/generate<br>• Runtime real-time param select, resolve and create<br>• Parallel resolve optimized to the minimized HLP set | HRDM Schema -to- HVL constraints<br>(SV/e/SysC/...) |
| Config space 'walker'<br>• Coverage HLP space covers ALL parts<br>• User targeted/weighted HLP config sequencing | HRDM Schema -to- HVL sequences<br>(SV/e/SysC/...) |
| Config space coverage<br>• Each HLP any combo • Part HLP space covers ALL parts<br>• User HLP sequential tracking + description (parameterization) | HRDM Schema -to- Part/List Coverage / Checklist<br>[HVL|HTML|PDF|XLS...] |
| Config space as Metadata<br>• Digestible ease of Maintenance + Automation<br>• Capture per param values and per value HLP dependency | HRDM Schema -to- Parts Library | Others<br>REAL Part descriptors -<br>[SOMA, XML, UML, SV, Tables, Datasheets] |

FIG. 9

SYSTEM AND METHOD FOR CREATING A HIGH-LEVEL PARAMETER RELATIONAL DATA MODEL FOR MEMORY CONFIGURABILITY SOLUTIONS

BACKGROUND

Most modern electronic systems use memory components, to store executable software or to store data. As such, it has become essential to have access to accurate memory models when working with electronic designs, particularly during the functional verification process. Typically, memory models are available in proven, standards-based libraries, and possess specific parameters. Further, the libraries normally provide a comprehensive solution that supports any type of simulation environment.

To verify these memory models a memory device is normally represented as a signal-level protocol interface to a storage array, where the signal-level interface must conform to the timing and behavior of the memory protocol. These memory protocols are commonly specified in an industry standard, such as the Joint Electron Device Engineering Council's (JEDEC) JES79-3F standard for double data rate version 3 (DDR3) or, they may be described in a device manufacturer's datasheet. How the storage array is implemented is not directly visible to the user, but for simulation models it is generally implemented using either a SystemVerilog (SV) data structure or an optimized C data structure.

Unfortunately, at present in order to perform dynamic configuration selection across the entire memory library requires compiling thousands of memory configuration files into the environment and iterating through all of them for query terms. This results in a data model that is potentially hundreds of times larger than necessary and that takes hundreds of times longer to compile as a queue of parts. Having to iteratively manage, maintain, and compile a generated parts list for runtime part query filtering creates a considerable amount of unwanted overhead. Ideally, a memory model would not have these limitations, and would also facilitate resolution for only real parts with the fastest speed, the greatest ease-of-use, and an even distribution of resources. Additionally, an ideal memory model would provide a means for verifying an open and protected coverage compatibility compliance match. Further, an optimized query and data model would not be limited to homogenous parts, but would also include heterogenous and hierarchical parts, such as dual data rate 4 dual in-line memory module (ddr4dimm) or ddr5dimm.

The specifications provided by a standards body such as JEDEC explicitly or implicitly describe memory characterization parameters and scope the valid set of values for each, but not all parameter valid value combinations may represent legal and/or real parts. In this context, legal refers to the configuration scope space described by the standard body's open and/or confidentially disclosed specification, for example the JEDEC ddr5sdram standard, Additionally, real refers to the configuration scope space of a memory vendor manufacturer's disclosed advertised and/or confidential memory datasheets whether road mapped and/or physically existing characterized memory parts. These only legal and real unique configuration combinations can number in the tens of thousands per memory type specification and per vendor, because each configuration includes hundreds of memory characterization parameters, and each parameter is assigned a valid value in legal and/or real unique combination with other parameters).

SUMMARY

In one or more embodiments of the present disclosure, a method for creating a relational memory configuration for one or more key parameters in at least one memory part configurations library is provided. The method may include identifying one or more high-level parameters (HLPs) within the at least one memory part configurations library and assigning each non-HLP parameter an HLP key. The method may further include using the assigned HLP keys as a frame of reference to cross-correlate each non-HLP parameter with every other non-HLP parameter in the at least one memory part configurations library. The method may also include extracting a complete relational memory attribute set from the cross-correlated parameters in the at least one memory part configurations library and generating memory configuration metadata equivalent to the at least one memory part configurations library from the complete relational memory attribute set. The method may further include providing memory part automation from the generated memory configuration metadata.

One or more of the following features may be included. In some embodiments, one or more HLPs may also be identified from among parameters described in one or more external sources, such as memory specifications or vendor datasheets. The complete relational memory attribute set can also be extracted from the cross-correlated parameters in the one or more external sources, such as memory specifications or vendor datasheets. In some embodiments, each identified HLP may have a variable parameter value and all non-HLP parameters may have a fixed parameter value, such that each fixed non-HLP parameter value may be mapped onto a unique combination of variable HLP values. Each HLP key may be defined by a unique combination of HLP values corresponding to a specific non-HLP parameter. The generated metadata may describe the settings and interdependencies of each non-HLP parameter across vendor data sheets. The method may further include providing a generic memory protocol interface, and a memory model device under test (DUT) interface that may support any memory model part in any hardware verification language (HVL). The method may also include allowing for memory model creation at simulation runtime per memory part configuration. The method may further include exporting compatibility coverage compliance matching and tracking to only real memory parts and making part compatibility coverage compliance customizable to HLP boundaries. The method may also include encrypting vendor, standard body, and memory model provider electronic design automation (EDA) confidential memory information.

In one or more embodiments of the present disclosure, a method for creating a relational memory configuration for one or more key parameters in at least one memory part configurations library is provided. The method may include identifying one or more HLPs within the at least one memory part configurations library and adding each identified HLP parameter to a set of common parameters that define a memory part, for each memory part included in the at least one memory part configurations library. The method may further include extracting the complete set of parameter values from each memory part included in the at least one memory part configurations library to create a per parameter set of valid values. The method may also include, for each parameter value within each memory part: capturing the set of identified HLP values associated with the parameter, and linking the captured set of identified HLP values associated with the parameter back to the parameter itself to create a table of HLP dependencies. The method may further include interconnecting the per parameter set of valid values with the table of HLP dependencies to create a relational data model of per parameter value HLP dependencies, generating memory configuration metadata equivalent to the at least one memory part configurations library from the complete relational memory attribute set, and providing memory part automation from the generated memory configuration metadata.

One or more of the following features may be included. In some embodiments, one or more HLPs may also be identified from among parameters described in one or more external sources, such as memory specifications or vendor datasheets. The complete relational memory attribute set can also be extracted from the cross-correlated parameters in the one or more external sources, such as memory specifications or vendor datasheets. Each identified HLP having a variable parameter value and all other parameters have a fixed parameter value, such that each fixed parameter value can be mapped onto a unique combination of HLP values. The parameter values that share a common HLP link may define a legal/real memory part combination. The relational data model of per parameter value HLP dependencies may be bi-directional, such that the per parameter value the set of HLP dependencies may be linked and inversely per HLP table the set of parameters may be linked. The method may further include providing a generic memory protocol interface, and a memory model DUT interface that may support any memory model part in any HVL. Providing memory model creation at simulation run-time per memory part configuration. Exporting compatibility coverage compliance matching and tracking to only real memory parts and making part compatibility coverage compliance customizable to HLP boundaries. The method may further include encrypting vendor, standard body, and memory model provider confidential memory information.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 9 shows a table of useful output transform commands that can be executed on an HRDM in accordance with embodiments the present disclosure.

DETAILED DESCRIPTION

Figure 1:
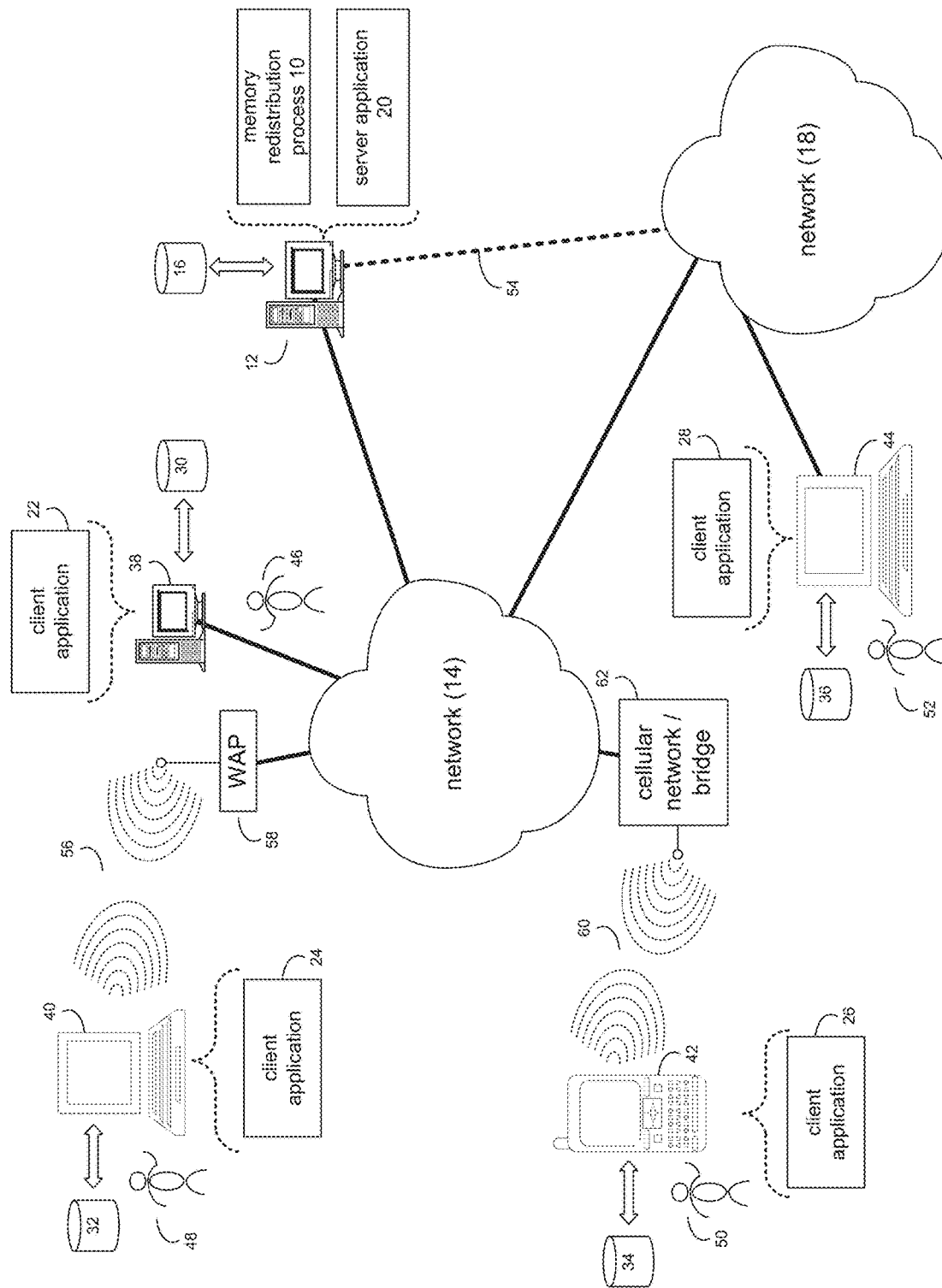
FIG. 1 diagrammatically depicts a memory redistribution process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

A challenge inherent to SOC validation is confirming the SOC's external memory sub-system interface is compliant and compatible across its applicable space of legal and real memory part characterization configurations. A challenge inherent to commercial memory model providers is to maintain and provide these distinct configurations representing only real and legal memory parts. Both the SOC developer and the memory model provider could benefit by having these parameter value sets, and value set combinations represented instead in a relational data model. Establishing these relations through a relational database provides many benefits. For example, relational models: (i) create meaningful data exposing relations between the data, (ii) reduce duplicate data and thereby reducing space, (iii) ease maintenance and customization by providing increased uniformity between specification and data model flexibility, and enhance the power of data queries and analysis.

If a configuration part library already exists, these relational value set inter-dependencies are inherent to it, but in a library containing many thousands of part configuration combinations, hundreds of parameters, and multiple values per parameter make the cross-correlation discovery dependency of every value to every other parameter unsolvable by means of iteration to identify correlation.

Referring to FIG. 1, there is shown a memory redistribution process 10 that may reside on and may be executed by server computer 12, which may be connected to network 14 (e.g., the internet or a local area network). Examples of server computer 12 may include, but are not limited to: a personal computer, a server computer, a series of server computers, a minicomputer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally, and/or alternatively, memory redistribution process 10 may reside on a client electronic device, such as a personal computer, notebook computer, personal digital assistant, or the like.

The instruction sets and subroutines of the memory redistribution process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a redundant array of independent disks (RAID) array; a random-access memory (RAM); and a read-only memory (ROM).

Server computer 12 may execute a web server application, examples of which may include but are not limited to: Microsoft IIS™, Novell Webserver™, or Apache Webserver™, which allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Microsoft Exchange™ Server, etc. Server application 20 may interact with one or more client applications (e.g., client applications 22, 24, 26, 28) in order to execute memory redistribution process 10. Examples of client applications 22, 24, 26, 28 may include, but are not limited to, EDAs or design verification tools such as those available from the assignee of the present disclosure. These applications may also be executed by server computer 12. In some embodiments, memory redistribution process 10 may be a stand-alone application that interfaces with server application 20 or may be applets/applications that may be executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition, or as an alternative to being server-based applications residing on server computer 12, memory redistribution process 10 may be a client-side application residing on one or more client electronic devices 38, 40, 42, 44 (e.g., stored on storage devices 30, 32, 34, 36, respectively). As such, memory redistribution process 10 may be a stand-alone application that interfaces with a client application (e.g., client applications 22, 24, 26, 28), or may be applets/applications that may be executed within a client application. As such, memory redistribution process 10 may be a client-side process, server-side process, or hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; redundant array of independent disks (RAID) arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize the EDA to create an electronic design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, memory redistribution process 10 may be a cloud-based process as any or all of the operations described herein may occur, in whole or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™ Redhat Linux™, Apple iOS, ANDROID, or a custom operating system.

Embodiments of the present disclosure may provide a memory model with improved performance and with increased functionality that may use high-level parameters (HLPs) to create a relational data model that accounts for the complete configuration data across the real, roadmapped, and emerging memory parts of a memory parts library. Accordingly, a high-level-parameter relational data model (HRDM) may account for hundreds of tabled sets of valid parameter values across potentially thousands of part offerings that make up each type and generation of memory. In some embodiments, each memory part may include attribute and value settings that, in part, describe and quantify static characteristics such as timings, features, sizes, structures, etc. Further, each memory part may include one or more states such as modes and speeds. To create this HRDM, every data value in the memory library may be linked by relation to an identified minimal optimal set of HLPs, such that the HLP interconnects between parameter values describe the legal value combinations representing real part configurations, where in general HLPs are those parameters whose values are not described as dependent on other parameters (other than the bi-directional dependency applied to non-HLP values), and non-HLP values are described explicitly in terms of dependence on other parameters. More specifically, each non-HLP 706 depends on a variable combination of HLPs 708, see FIG. 7. Once established and optimized the HRDM would be able to dynamically resolve, query, analyze, and generate memory part configurations for compliance and compatibility.

Figure 2:
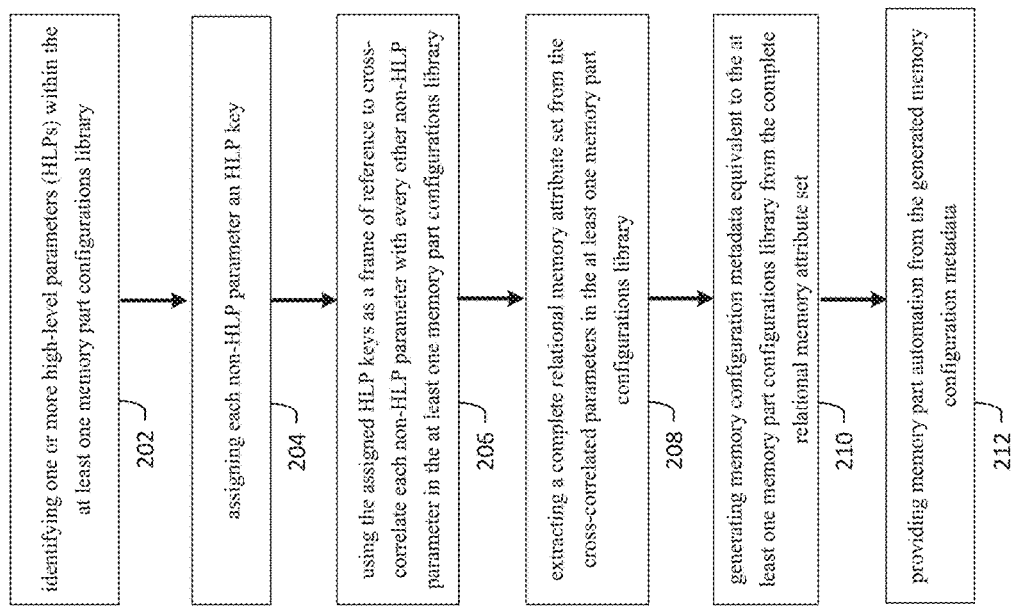
FIG. 2 shows a flowchart of a memory redistribution process in accordance with the present disclosure.

Referring now to FIG. 2, a flowchart showing one embodiment of a memory redistribution process 10 in accordance with the present disclosure is provided. In some embodiments, memory redistribution process 10 may include identifying 202 one or more high-level parameters (HLPs) within the at least one memory part configurations library and assigning 204 each non-HLP parameter an HLP key. The method may further include using 206 the assigned HLP keys as a frame of reference to cross-correlate each non-HLP parameter with every other non-HLP parameter in the at least one memory part configurations library. The method may also include extracting 208 a complete relational memory attribute set from the cross-correlated parameters in the at least one memory part configurations library and generating 210 memory configuration metadata equivalents to the at least one memory part configurations library from the complete relational memory attribute set. The method may further include providing 212 memory part automation from the generated memory configuration metadata. Each of these operations is discussed in further detail hereinbelow.

In some embodiments, memory redistribution process 10 may further include providing a generic memory protocol interface that allows for a memory model DUT interface to support any memory model part in any hardware verification language (HVL) or providing memory model creation at simulation runtime per memory part configuration. Providing an HRDM accelerates the effective memory compliance and compatibility closure in pre-silicon SOC memory subsystem validation through: (i) on-the-fly real memory part generation and compatibility coverage, (ii) using open, flexible, user-applicable formats such as simulator/language/formatting tools/docs, (iii) optimizing system performance with reduced code size/compilation-time/memory-footprint/runtime, and (iv) by resoling in way that still protects confidential vendor information. Memory distribution process 10 may further include providing the HRDM for user configuration analysis and selection at simulation runtime, as well as providing other useful transforms such as configuration constraints equivalent and part configuration coverage from the same metadata.

In some embodiments, there is some amount of configuration difference between all real memory parts. Whether the difference is in timings, features, pins, addressing, structure/architecture, valid mode sets, etc., the differences are discernable. However, it is also clear that some parts are more like each other than others, and that by looking over the hundreds of parameters (e.g., ddr5 has >400) it is virtually impossible to visually see the correlations between value sets of what sets change and when the changes are made. However, over the last few decades vendors have published datasheets, lists of part name variations, and many memory protocol standard specifications have been developed. All of which provide an extensive frame of reference for establishing a relational database.

Figure 3:
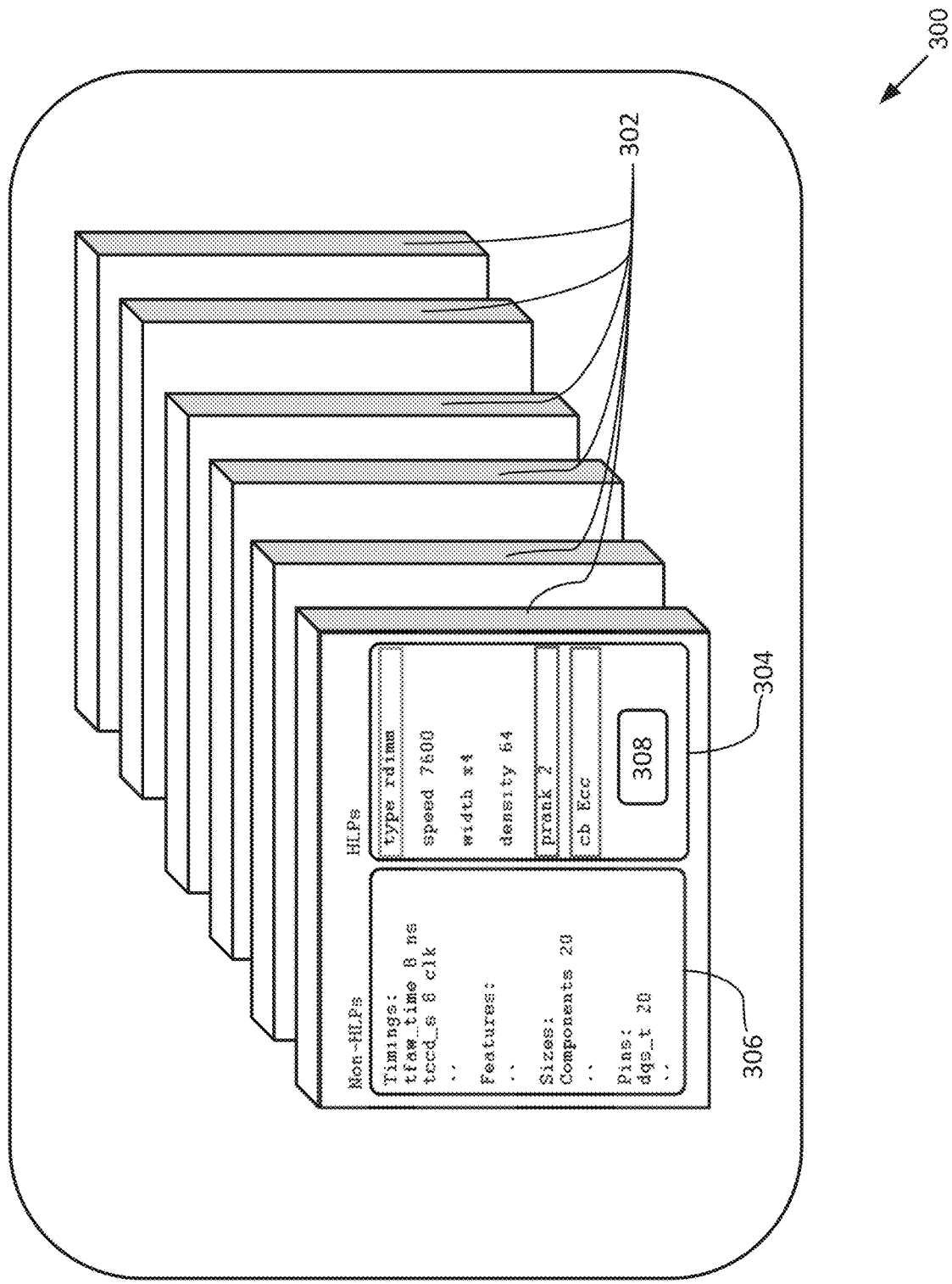
FIG. 3 shows a block diagram of a memory parts library in accordance with embodiments in the present disclosure.

Referring now to FIG. 3, a block diagram of a memory parts library 300 in accordance with embodiments in the present disclosure is provided. It is well known that of the hundreds of memory attributes 302 that exist within a memory parts library 300 only a very select few of memory attributes 302 vary across a small set of parameters that are denoted as high-level parameters (HLPs) 304. A few examples of HLPs 304 may include, but are not limited to, speed, density, vendor, width, memory type, memory subtype, etc. In some embodiments, each HLP may include a variable parameter value, while all other parameters have a fixed parameter value. All other parameters included in memory attribute 302 may be denoted as non-high-level-parameters (non-HLPs) 306, such that all non-HLPs 306 have a fixed value. A few examples of non-HLPs 306 may include, but are not limited to, timings, features, pins, addressing, structure/architecture, valid mode sets, etc. Each non-HLP 306 value may be mapped onto a unique combination of variable HLP 304 values, which may be referred to as HLP keys 308. As such, identifying 202 the one or more HLPs 304 within the at least one memory part configurations library 300 as described in the memory redistribution process 10 shown in FIG. 2 can be accomplished by checking each parameter value for each memory attribute 302 and determining if the value changes across memory attributes 302.

In some embodiments, the discovery of the memory parameter value interdependencies to these HLPs 304 may be accomplished by adding and applicably assigning 204 HLPs 304 as common parameters across the entirety of the set of memory parts 300 as described in the memory redistribution process 10 shown in FIG. 2. For example, only one fixed value set of non-HLPs 306, (e.g., timings+features+pinouts+addressing+structure/architecture+ . . . ) exist for every unique HLP value 304, (e.g., concatenated combination of vendor×speed×width×density×mem-type(subtype)). Therefore, each HLP key 308 may be used when cross-correlating 206 every non-HLP 306 to every other non-HLP 306 in the memory parts library 300 as described in the memory redistribution process 10 shown in FIG. 2. Further, all unique real and legal combinations can be mapped to a unique HLP key combination, for example PartX[HLP Key={vendor(Vendor1|Vendor2|Vendor3| . . . ), speed(7600), width(4), density(64), type(rdimm)}.

In some embodiments, the HLP interconnects between the parameter values describe the legal value combinations for part configurations, and parameter values that share a common HLP link make a legal part combination. For example, a unique Part[x] may have a unique HLP key[x], such that Part[x]=(speedx, widthx, depthx, vendorx, mem-typex). As such, the set of all parts may be given by the complete HLP value combination set, $\Sigma$(HLP key[i])=(speed*, width*, depth*, vendor*, mem-type*), where i varies from 0 to the maximum number of parts. In this way, the settings and interdependencies of each non-HLP 306 parameter across vendor data sheets may be used when generating memory configuration metadata equivalent to the at least one memory part configurations library from the complete relational memory attribute set from as described in the memory redistribution process shown in FIG. 2.

Figure 4:
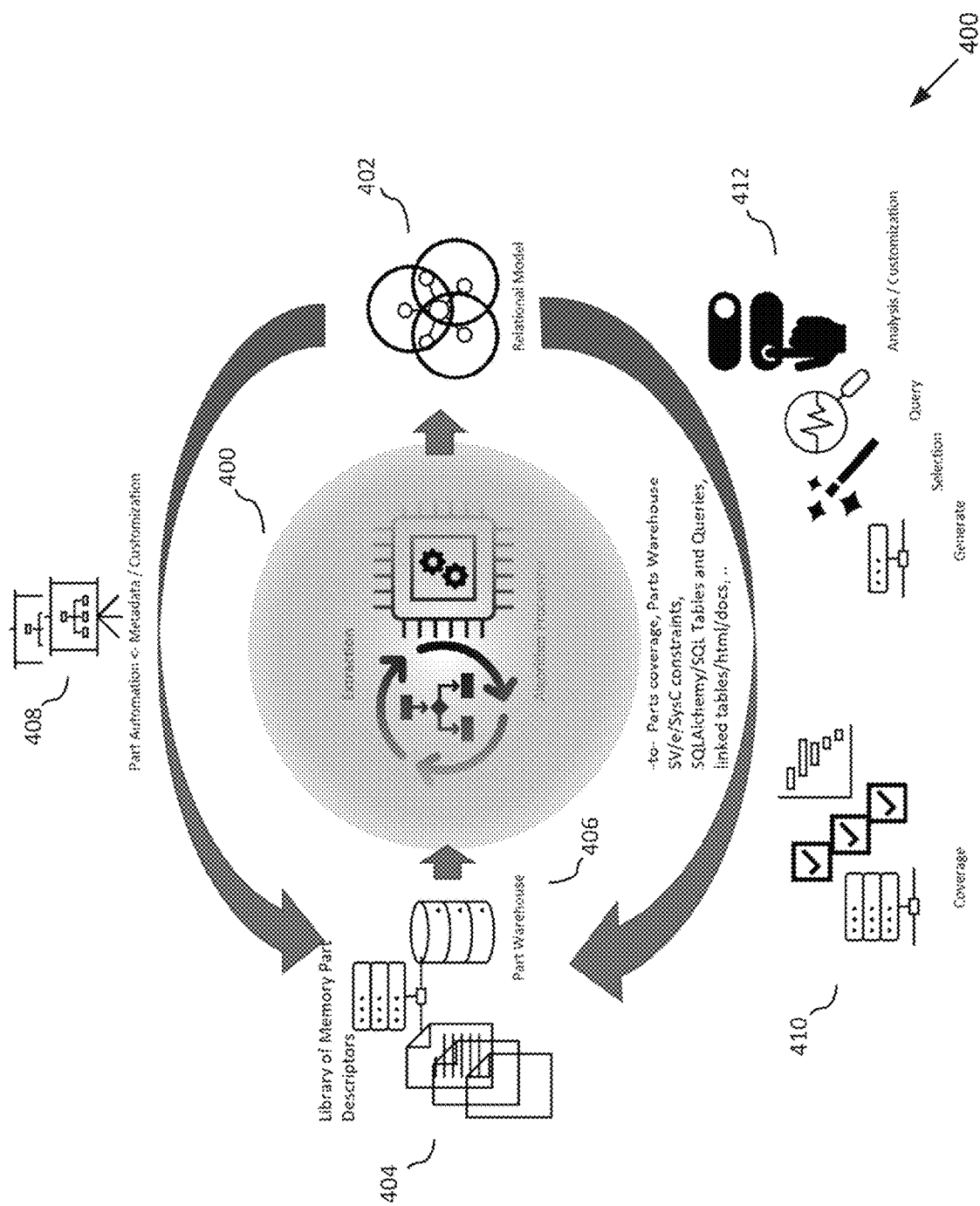
FIG. 4 shows an overview of how an high-level-parameter relational data model (HRDM) may be established from a pre-existing parts library in accordance with embodiments in the present disclosure.

Referring now to FIG. 4, one example of how an HRDM 400 may be established in accordance with embodiments of the present disclosure is provided. In order to establish a relational data model 402 of per-parameter HLP dependencies, relational discovery and extraction may occur in one of two ways. Either the data may be imported from an existing real memory part configurations library 404, or the data may be read from memory standards specifications and/or from memory vendor datasheets, represented by part warehouse 406. In either case, HRDM 400 may be established and metadata 408 from that relational model 404 may then be used to regenerate memory parts library 402 in its entirety, and provide coverage 410, where coverage may be broadly defined as the percentage of verification objectives completed. In some embodiments, the HRDM 400 may also provide a suite of user tools 412 that may include configuration analysis, query, selection, generation of part configuration(s) in needed formats, including at simulation runtime.

In some embodiments, a complete set of all parameter values described may be captured, and for every parameter value captured there may be an accompanying set of HLP value combinations linked across the memory parts. The resulting data model may contain per parameter sets of valid values, parameter value tables, i.e., the complete memory configuration data tabled, per HLP parameter sets of valid values, and HLP value tables. In this way, the interconnection of per-parameter values and the set of HLP dependencies may be linked. Conversely, the set of per HLP value-combinations and the set of parameter values may also be linked, which makes the relationship bi-directional.

Figure 5:
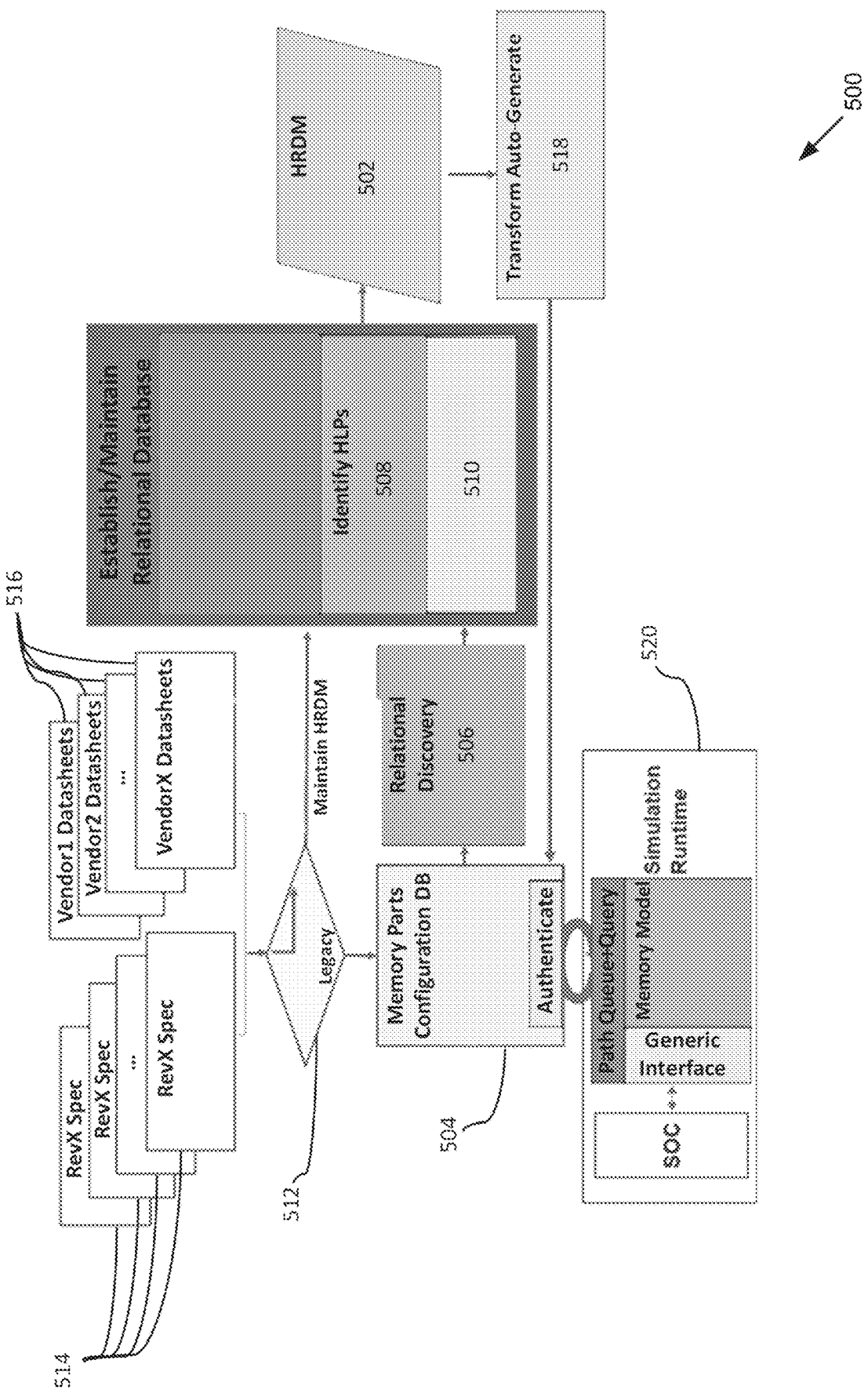
FIG. 5 shows a block diagram of how an HRDM may be established from a pre-existing parts library in accordance with embodiments in the present disclosure.

Referring now to FIG. 5, a block diagram 500 of how an HRDM 502 may be established from a pre-existing parts library 504 in accordance with embodiments of the present disclosure is provided. Using pre-existing parts library 504 allows for HRDM 502 to directly import every parameter from every memory attribute stored in the pre-existing parts library 504. Then, the relational discovery process 506 may begin identifying HLPs 508 and using HLP keys to map 510 out the non-HLP relationships as previously discussed. While HRDM 502 is being established a legacy flow 512 may be used to generate and maintain parts directly from protocol specifications 514 or from vendor data sheets 516. This legacy flow 512 may be used to generate derived parameters and values from various specifications and datasheets to create and maintain hundreds or thousands of parts, but once the HRDM 502 is established this legacy flow of directly maintaining all parts may be replaced with an auto-generate transform 518. Since the legacy parts library pre-dated the HRDM, the HRDM may be automatically discovered and generated, by providing 212 generated memory configuration metadata in the relational discovery process 506, as described by memory redistribution process 10 in FIG. 2.

In some embodiments, a simulation runtime environment configuration phase 520 may be included to provide users with a simple native user query, constraints, iteration, or part selection capability to target memory selection within user's immediate on-the-fly application/scenario needs across the complete relational memory attribute set of features, settings, pins, addressing, registers, etc.

Figure 6:
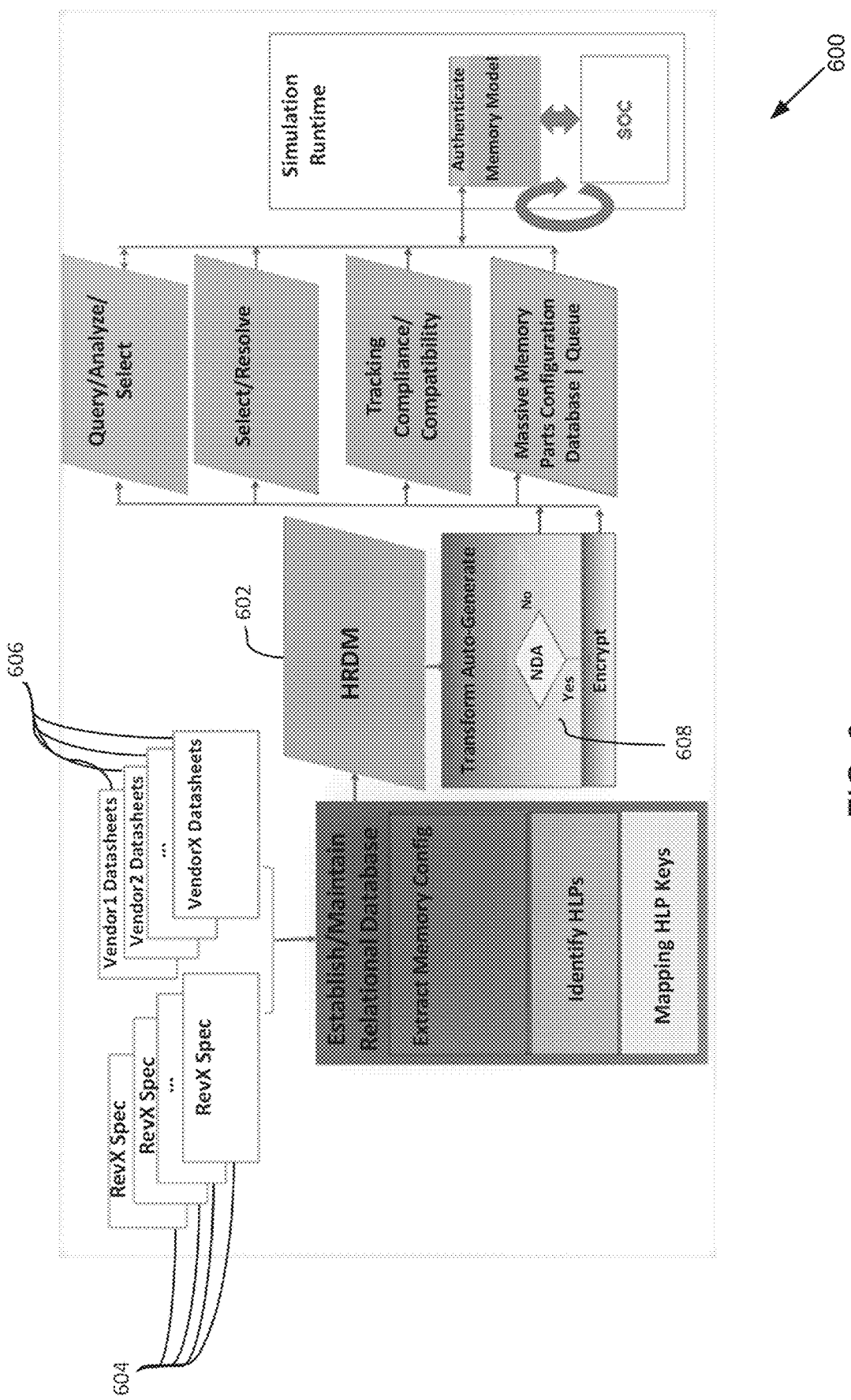
FIG. 6 shows a block diagram of how an HRDM may be established from protocol specifications and vendor datasheets in accordance with embodiments in the present disclosure.

Referring now to FIG. 6, a block diagram 600 of how an HRDM 602 may be established from protocol specifications 604 and vendor datasheets 606 in accordance with an embodiment of the present disclosure is provided. In this particular example, block diagram 600 shows where HRDM 602 may be generated directly from protocol specifications 604 and vendor datasheets 606 without the benefit of a pre-existing parts library to jump-start the relational discovery process. Further, it should be noted that HRDM 602 may be maintained and/or formatted using any suitable database tool without departing from the teachings of the present disclosure. Block diagram 600 shows a similar flow to that depicted in FIG. 5 through to auto-generate transform 608. The objective here is to establish the HRDM as quickly as possible in order to reap the benefits of the relational data model (such as size, speed, closure, maintenance, reduced duplication).

Figure 7:
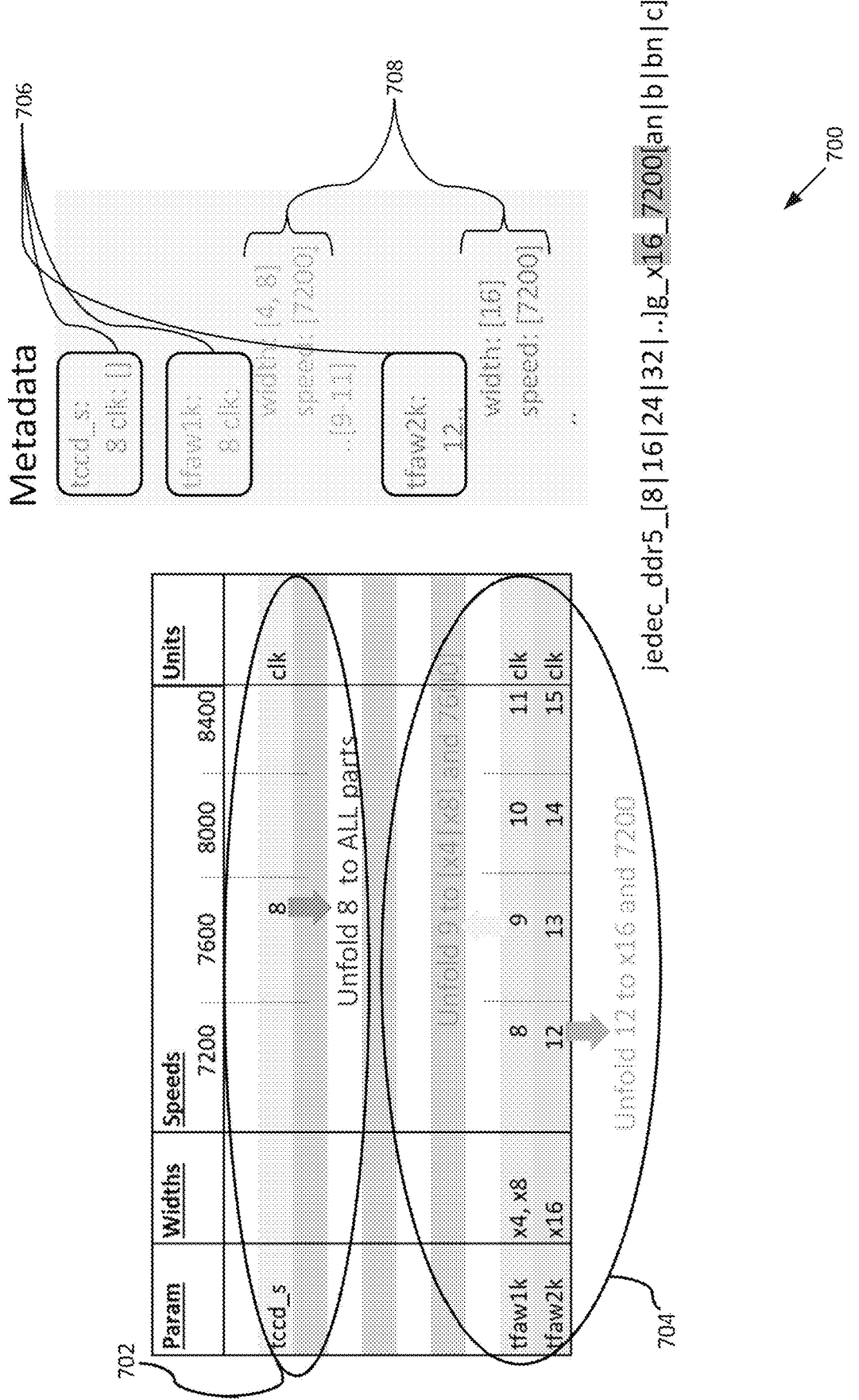
FIG. 7 shows a comparison between data stored in an HRDM and data stored in a conventional data model in accordance with embodiments in the present disclosure.

Referring now to FIG. 7, a comparison 700 between data stored in HRDM 702 and data stored in a conventional data model 704 in accordance with embodiments the present disclosure is provided. As discussed above, the memory configuration data may be maintained and stored in a parts library of per part instances and, as such, these parts libraries may incur a massive data duplication cost since most every parameter value exists across some spec/datasheet qualified set of many parts. This "fanout" data model 704 has a cascading effect as a result of each parameter value needing to be captured into each applicable part configuration where parameter=value. In contrast, the HRDM discussed herein may be considered a "folded" data model 702, since the complete parameter value set used across all part configuration combinations may only require each parameter value to be tabled exactly once per value data model. This allows the HRDM data model 702 to collapse all of the parts library's data value duplication into atomic parameter value data points, which may then be expanded/unfolded to precisely represent the complete set of memory parts in the parts configuration library. Additionally, each tabled value 706 (e.g.: tccd_s=8, tfaw1k=8, 9, . . . 11) is a unique atomic param+value referred here, captured once into HRDM, along with an HLP key 708 (e.g.: width[ ] && speed[ ]) as needed.

In some embodiments, many memory types and/or memory configuration part libraries may already exist. Accordingly, the HLP relational discovery process discussed earlier may also be applied to these libraries to automatically generate the HRDM. Similarly, the reverse process may also be accomplished, wherein an established relational data model may be used to generate the entirety of a memory part configurations library. This reverse may be achieved by iterating over the HLP key combinations as indexes into the relational data model to obtain each unique HLP linked combination of legal parameter values (part). It should be noted that the format for the relational data model may have various forms such as YAML metadata, JavaScript, SQL, etc. This ability to go back and forth validates and proves that the identified HLP key combinations exactly represent the part set just as completely as the collapsed data model representation, with the difference being that the collapsed data model is presented in a form that optimizes performance in terms of code size, compilation-time, memory-footprint, runtime, etc.

From an EDA perspective, a folded data model provides the HRDM with massive benefits in the maintenance and upkeep of memory configurations as a relational data model. Additionally and/or alternatively, the HRDM structure provides a walkable, labeled, queriable tabulated format.

In some embodiments, the intersection of interconnects that match HLP constraints produce the complete set of legal/real parts that match the high-level constraints, such that Parts Match=$HLP_{[range\ or\ constraint]}$ Intersect Subset= ($speed_{[range\ or\ constraint]}$, $width_{[range\ or\ constraint]}$, . . . , $param_{[range\ or\ constraint]}$ . . . ). All search results may return only legal configuration combinations as HLP interconnects, where HLP key=(speed*s, width*s, depth*s, vendor*s, mem-type*s).

In some embodiments, allowing user access to the relational memory configuration model at runtime provides the query, analysis, and resolution advantages of a relational database to memory data. The HRDM tables may be opened for the user to expand/customize/relate the provided HRDM tables with their SOC parameter values through the use of tools like the SQL "join" command.

In some embodiments, an HRDM application programming interface (API) may provide the user with runtime dynamic configuration analysis information.

Figure 8:
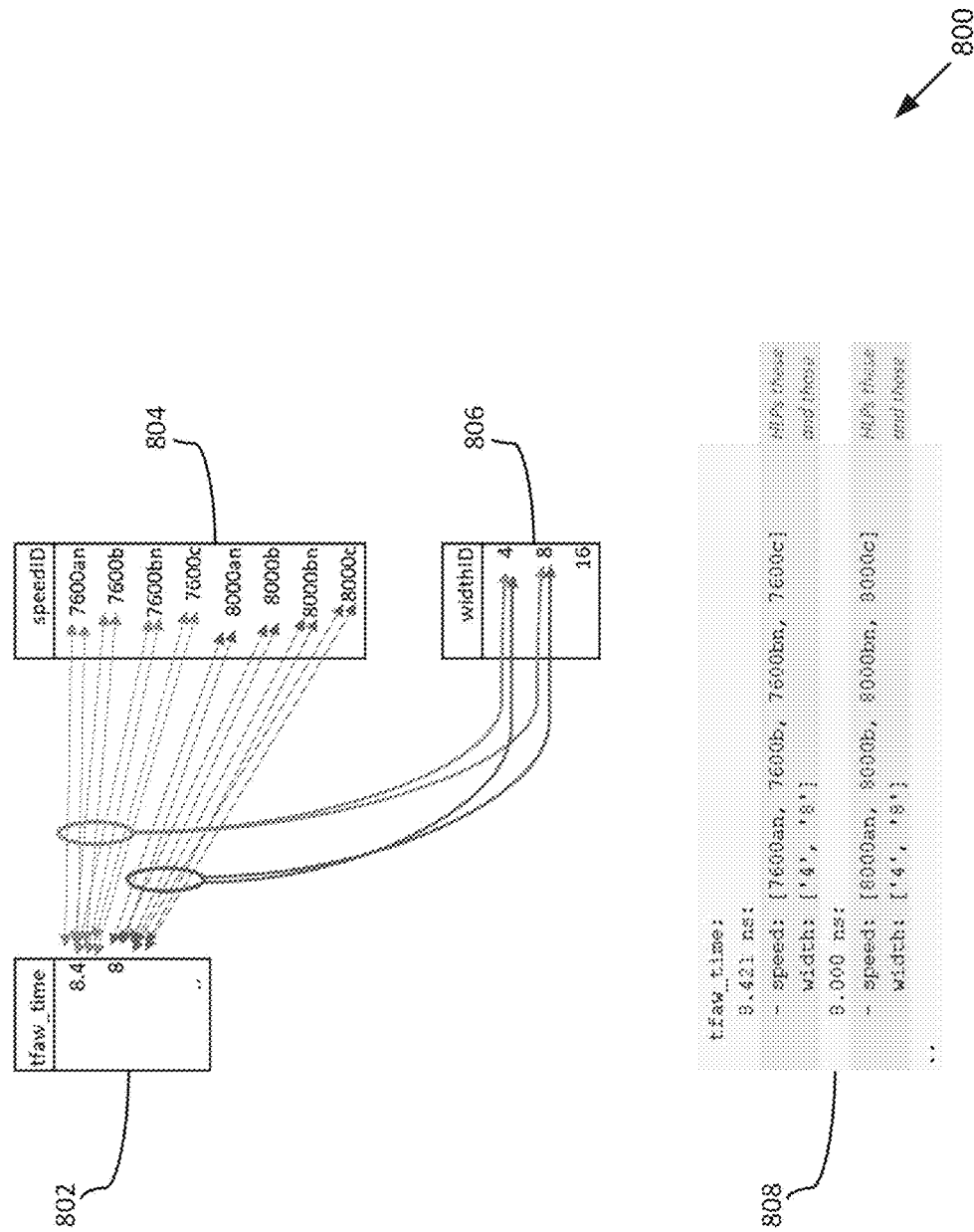
FIG. 8 shows a representation of how a memory redistribution process may extracts and folds data into an HRDM in accordance with embodiments the present disclosure.

Referring now to FIG. 8, a representation 800 showing the extracting and folding of data into an HRDM in accordance with embodiments the present disclosure is provided. The relational discovery automation iterates to correlate all pre-existing legacy parameter values, like tfaw_time timing parameter 802, to the new common HLP values of speedID 804 and widthID 806 that exist across the parts included in the library, in a one-time step to establish the HRDM. Further, metadata 808 shows exactly which parameter values are used in the mapping. The discovery automation may extract all configuration values across parts and folds them, into the HRDM along with their HLP relations/metadata 808, which map the legal combinations for a few values of the 'tfaw_time' parameter amidst the hundreds of parameters getting condensed and linked from parts into the HRDM. In some embodiments, the HRDM (or equivalent metadata) may be maintained directly from there on from evolving specifications and datasheets, and then part updates may be automatically generated with any HRDM (metadata) update.

Referring now to FIG. 9, a table 900 of exemplary output transform commands that may be executed on an HRDM in accordance with embodiments the present disclosure is provided. End user products may be generated from HRDM to accelerate the effective memory compliance and compatibility closure during a pre-silicon SOC memory subsystem validation. The purpose of these output transforms is to take the partial, full, or expanded extracted collected relational configuration value set of HRDM, which has been abstracted from memory part information, and generate other useful representative formats. HRDM may support customizations (e.g., parameter, value, relation, etc.), modifications, removals, additions, to the extracted in advance of the transform process, which may lead to an expanded or reduced: set of part configurations or other format, per part attribute set, or per attribute value set.

In some embodiments, transforms may convert an extracted HRDM to alternative useful representative formats that may be folded (such as SystemVerilog (SV) constraints) or unfolded (such as parts coverage lists, and part generation). However, these may be provided in the specific language and format needed by end user resolution tool, e.g., simulator supported SV/e/SystemC/other relational constraint set formats.

It should be noted that while the outputs of table 900 (e.g., constraints, coverage, sequences, etc.) over the memory configuration space are extremely useful formats for SOC memory subsystem validation, file outputs are not the only generated output possible. The HRDM itself as a runtime queryable data model is a powerful tool.

In some embodiments, automatically generated constraints may be automatically transformed from HRDM's more tabulated configuration representation into the equivalent constraint syntax of hardware verification languages (HVLs) like SV/e/SysC/. declarations/expressions/blocks/groupings. The transformed constraint set remains in the folded form of parameter value to HLP relationships as discussed for HRDM.

In some embodiments, the transformed constraint set output code may be confirmed to resolve across major simulator constraint solvers such as commercially or open source available simulators: (i) to only real legal part configurations of real part names matching value for value the source parts used for HRDM discovery, (ii) evenly across the space of parts source used in HRDM discovery, (iii) to express all layered settings of hierarchical parts, (iv) in the space of parts matching user's in-line constraints, and (v) across heterogenous parts. Like HRDM the resultant constraint representation is the equivalent sum-of-all parts that resolves to any part.

In some embodiments, the invested IP knowledge base in this single class, which packages the sum of all parts values, may be protected with encryption. Any and all parameter settings may be delivered as encrypted SV/e/SystemC except the source for HLP's sets of valid values may remain exposed to the user to aid their selection customization, such that the SV/e/SystemC compiles and runs the same as a readable SV/e/SystemC source while encrypting vendor, standard body, and memory model provider confidential memory information including the vendor's IP knowledge base of memory configurations.

In some embodiments, coverage may be broadly defined as the percentage of verification objectives completed. Here, the provided parts list coverage may provide a metric to evaluate the percentage of compatible memory parts for which compliance validation has progressed through (and the high-level parameters coverage). The parts coverage identifies the tested and untested compatible memory parts, and therefore may be used as a guide to directing randomized part selection and generation in further simulations, i.e., coverage directs user's selection criteria noted in the previous discussion on constraints resolution. This may provides a metric to determine adequate compliance and compatibility validation closure over the user's DUT space of advertised compatible memories.

In some embodiments, automatically generated real parts coverage and HLP settings coverage may be automatically transformed from the HRDM representation into the full parts list in a needed and working HVL coverage syntax format. Like the parts generation, the transformed parts list coverage may unfold all of the HRDM's relationship connections, the unique HLP keys in HRDM. Unlike parts generation here for parts coverage only the HLP keys may be needed to map to part names and therefore the part settings may not be necessary. The transformed coverage part set generated from HRDM may be confirmed to align 1:1 to the original source part set used for discovery, e.g., parts on a memory repository.

In some embodiments, HRDM may accelerate the effective memory compliance and compatibility closure in pre-silicon SOC memory subsystem validation, such as on-the-fly real memory part generation, compatibility coverage solution, and other open, flexible, user applicable formats. HRDM may also provide an optimized memory data model that benefits the scope of applications addressing memory configuration challenges.

In some embodiments, a dynamic on-the-fly memory part generation and compatibility approach may be used: (i) in simulation memory runtime configurability and tracking of only real memory parts, solved/tracked in an optimized, open, flexible, and user applicable way that still protects confidential vendor information, and (ii) to provide complete relational memory attribute set model that optimally resolves to only real parts. Whereas previously, the only known existing solutions involved selecting or querying through part lists or unconfirmed limited randomized resolution. Further, constraints or queues are the general approaches used by industry today. This described HRDM approach removes the overhead of iteratively managing, maintaining, and/or compiling a generated parts list for optimized runtime part query filtering, while still resolving to only real part(s) with confirmed result (certified, open+ protected, coverage compatibility compliance match). Further, it provides query, analysis, and resolution advantages of relational memory configuration model.

In some embodiments, a memory part configurations database may be used, which may provide a bridge to exactly when, where, and how the user needs this memory configuration capability. Whether it be used: (i) in the user environment's native HVL and simulator, (ii) on the memory sub-system interface slot port-mapped to user's SOC DUT (via a generic protocol interface technology supporting any/all parts), (iii) at simulation runtime environment configuration phase, (iv) with simple native user query, constraints, iteration, or part select capability to target memory selection within user's immediate on-the-fly application/scenario needs across (feature, setting, pins, addressing, registers, etc.), (v) to provide and expose all available valid attributes and value sets (not limited by NDA), (vi) to package this flexible, nimble, digestible configuration capability with decades proven authorization and encryption protections meeting vendor NDA and standards body expectations that are user familiar and native simulator supported, or (vii) on one memory relational configuration model representing thousands of memory part configurations that optimally resolves guaranteed to one (or more) real part configuration to flexibly meet user needs in format, function, time, and place.

Embodiments included herein provide a dynamic memory configuration approach that improves compile-time, memory-footprint, runtime-analysis, query, selection performance, and tracking. This is in contrast to the cost of having to manage, carry, queue, query, and track thousands of memory part class types and objects, and embodiments included herein may simultaneously solves the problem of memory subsystem part compatibility coverage using part match coverage to the complete set of real vendor/JEDEC authorized parts (or the user's application pared down subset providing the user a metric to evaluate the percentage of compatible memory parts for which compliance validation has progressed through).

It will be apparent to those skilled in the art that various modifications and variations can be made to memory redistribution process 10 and/or embodiments of the present disclosure without departing from the spirit or scope of the invention. Thus, it is intended that embodiments of the present disclosure cover the modifications and variations of this invention provided they come within the scope of the appended claims and their equivalents.

What is claimed is:
1. A method for creating a relational memory configuration for one or more key parameters in at least one memory part configurations library, the method comprising:
identifying one or more high-level parameters (HLPs) within the at least one memory part configurations library;
assigning each non-HLP parameter an HLP key;
using the assigned HLP keys as a frame of reference to cross-correlate each non-HLP parameter with every other non-HLP parameter in the at least one memory part configurations library;
extracting a complete relational memory attribute set from the cross-correlated parameters in the at least one memory part configurations library;
generating memory configuration metadata equivalent to the at least one memory part configurations library from the complete relational memory attribute set; and
providing memory part automation from the generated memory configuration metadata.

2. The method of claim 1, wherein the one or more HLPs can also be identified from among parameters described in one or more external sources, such as memory specifications or vendor datasheets.

3. The method of claim 2, wherein the complete relational memory attribute set can also be extracted from the cross-correlated parameters in the one or more external sources, such as memory specifications or vendor datasheets.

4. The method of claim 1, wherein each identified HLP has a variable parameter value and all non-HLP parameters have a fixed parameter value, such that each fixed non-HLP parameter value can be mapped onto a unique combination of variable HLP values.

5. The method of claim 4, wherein each HLP key is defined by a unique combination of HLP values corresponding to a specific non-HLP parameter.

6. The method of claim 1, wherein the generated metadata describes the settings and HLP interdependencies of each non-HLP parameter across vendor data sheets.

7. The method of claim 1, further comprising: providing a generic memory protocol interface, wherein a memory model device under test (DUT) interface supports any memory model part in any hardware verification language (HVL).

8. The method of claim 1, further comprising: allowing for memory model creation at simulation runtime per memory part configuration.

9. The method of claim 1, further comprising: exporting compatibility coverage compliance matching and tracking to only real memory parts; and
making part compatibility coverage compliance customizable to HLP boundaries.

10. The method of claim 1, further comprising: encrypting vendor, standard body, and memory model provider electronic design automation (EDA) confidential memory information.

11. A method for creating a relational memory configuration for one or more key parameters in at least one memory part configurations library, the method comprising: identifying one or more high-level parameters (HLPs) within the at least one memory part configurations library;
adding each identified HLP parameter to a set of common parameters that define a memory part, for each memory part included in the at least one memory part configurations library;
extracting the complete set of parameter values from each memory part included in the at least one memory part configurations library to create a per parameter set of valid values;
for each parameter value within each memory part:
capture the set of identified HLP values associated with the parameter; and
link the captured set of identified HLP values associated with the parameter back to the parameter itself to create a table of HLP dependencies;
interconnecting the per parameter set of valid values with the table of HLP dependencies to create a relational data model of per parameter value HLP dependencies;
generating memory configuration metadata equivalent to the at least one memory part configurations library from the complete relational memory attribute set; and
providing memory part automation from the generated memory configuration metadata.

12. The method of claim 11, wherein the one or more HLPs can also be identified from among parameters described in one or more external sources, such as memory specifications or vendor datasheets.

13. The method of claim 12, wherein the complete relational memory attribute set can also be extracted from the cross-correlated parameters in the one or more external sources, such as memory specifications or vendor datasheets.

14. The method of claim 11, wherein each identified HLP has a variable parameter value and all other parameters have a fixed parameter value, such that each fixed parameter value can be mapped onto a unique combination of HLP values.

15. The method of claim 11, wherein parameter values that share a common HLP link define a legal/real memory part combination.

16. The method of claim 11, wherein the relational data model of per parameter value HLP dependencies is bi-directional, such that per parameter value the set of HLP dependencies are linked and inversely per HLP table the set of parameters are linked.

17. The method of claim 11, further comprising: providing a generic memory protocol interface, wherein a memory model DUT interface supports any memory model part in any HVL.

18. The method of claim 11, further comprising: providing memory model creation at simulation runtime per memory part configuration.

19. The method of claim 11, further comprising: exporting compatibility coverage compliance matching and tracking to only real memory parts; and making part compatibility coverage compliance customizable to HLP boundaries.

20. The method of claim 11, further comprising: encrypting vendor, standard body, and memory model provider EDA confidential memory information.

* * * * *